March 15, 1960 S. A. SCHERBATSKOY Re. 24,797

NUCLEAR WELL LOGGING

Original Filed Oct. 5, 1949 2 Sheets-Sheet 1

INVENTOR.

BY Serge A. Scherbatskoy.

NUCLEAR WELL LOGGING

Original Filed Oct. 5, 1949 2 Sheets-Sheet 2

INVENTOR.

BY Serge A. Scherbatskoy

United States Patent Office

Re. 24,797
Reissued Mar. 15, 1960

24,797

NUCLEAR WELL LOGGING

Serge A. Scherbatskoy, Tulsa, Okla., assignor, by mesne assignments, to PGAC Development Co., Houston, Tex., a corporation of Texas Original No. 2,648,012, dated August 4, 1953, Serial No. 119,601, October 5, 1949. Application for reissue August 3, 1955, Serial No. 526,343

30 Claims. (Cl. 250—71.5)

Matter enclosed in heavy brackets [ ] appears in the original patent but forms no part of this reissue specification; matter printed in italics indicates the additions made by reissue.

This invention is concerned with a method and apparatus for performing in a bore hole measurements of radiations resulting from nuclear transformations within the formations adjoining said bore hole, said nuclear transformations being caused by an external agent such as a source of neutrons placed adjacent to said formations in the neighborhood of a suitable detecting instrument.

Many measurements have been made of the above radiations. These measurements can be broadly classified in three types that are respectively designated as measurements of gamma radiation, measurements of slow neutrons and measurements of fast neutrons. In the measurements of the first type a detector of gamma radiations accompanied with a source of neutrons has been lowered into a bore hole in the earth and measurements were made at various depths of gamma radiations resulting from interaction of neutrons derived from said source with the adjoining formations. These measurements when correlated with depth provided a log commonly designated as neutron-gamma ray log. In the measurements of the second type a detector of slow neutrons accompanied with a source of neutrons has been lowered into a bore hole and the measurements obtained when correlated with depth provided a log commonly designated as neutron-slow neutron log. In the measurements of the third type a detector of fast neutrons accompanied with a source of neutrons may be lowered into a bore hole and the measurements obtained when correlated with depth will provide a log that we shall designate as neutron-fast neutron log.

In order to obtain a neutron-gamma ray log and a neutron-slow neutron log of the same bore hole, two separate instrumental arrangements were required, one utilizing a gamma ray detector and the other utilizing a slow neutron detector. Neutron-fast neutron logs have not been known in the prior art because of the failure to measure the fast neutrons without the background of gamma radiation.

This invention is primarily concerned in obtaining simultaneously by means of a single and common detector all the measurements of said three types and thus to obtain simultaneously a neutron-gamma ray, neutron-slow neutron and neutron-fast neutron log.

It is an object of the present invention to provide an improved method and improved apparatus for determining the character of unknown substances particularly adjacent to a bore hole.

For further details of specific devices embodying the principles of this invention and for a more complete understanding of the mode of application of the principles of this invention and the numerous advantages thereof, reference may be made to the accompanying drawings, in which.

Figure 1:
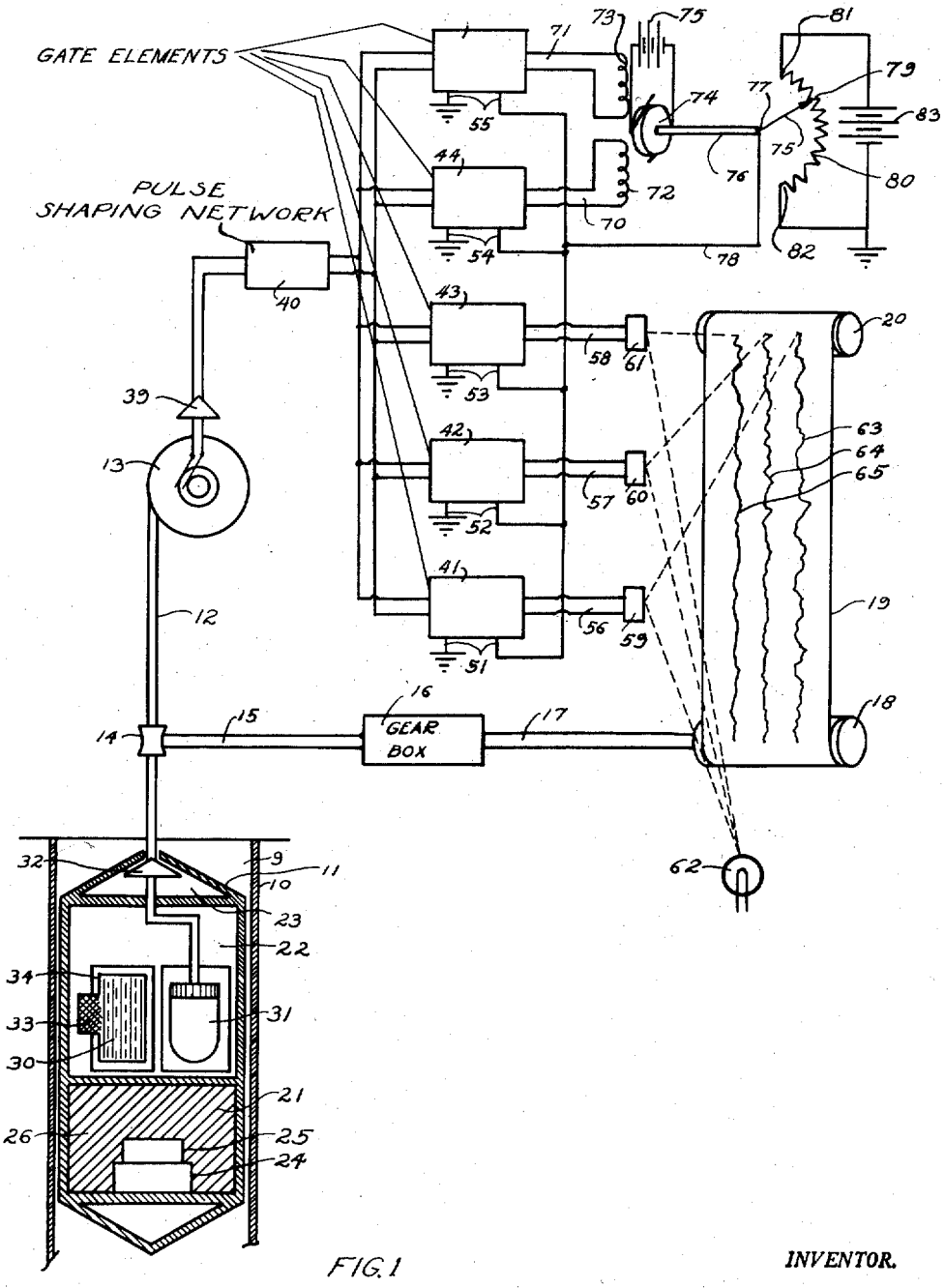
Fig. 1 illustrates diagrammatically a bore hole which penetrates the strata of the earth, and the general arrangement for logging the bore hole in accordance with the principles of the present invention.

Referring now to the drawing and particularly Fig. 1 thereof, there is schematically illustrated a drill hole 9 penetrating the formations to be explored. The drill hole is defined in the conventional manner by a tubular metallic casing designated by 10. For the purpose of exploring the formations along the bore hole there is provided in accordance with the present invention exploratory apparatus comprising a housing 11 which is lowered into the bore hole 9 by means of a cable 12, including as a part thereof suitable insulated conductors. The cable 12 has a length somewhat in excess of the depth of the bore hole to be explored and is normally wound on a drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 is mounted on a shaft 15, and rotation of the reel and consequently of the shaft 15 is transmitted through a gear box 16 to another shaft 17 which is drivingly connected to take up spool 18 for moving a photographic film 19 from a feed spool 20 to the take up spool 18.

The housing 11 of the exploratory apparatus is divided into three sections designated by numerals 21, 22, and 23, respectively. In the section 21 there is provided a solid support 24 on which is disposed a suitable source of neutrons generally designated as 25, such for example as radium beryllium preparation, which may be enclosed in a container made of a suitable material such as glass. Instead of radium beryllium preparation, the source of neutrons may comprise, for example, a discharge tube adapted to bombard a beryllium or lithium composition with deuterons, thus causing a generation of neutrons in a manner understood by those skilled in the art. This neutron source 25 is enclosed within a jacket 26 made of a material such as lead, which allows the neutron rays to pass completely, or for the greater part therethrough.

The section 22 comprises a scintillation counter consisting of an anthracene crystal 30, and a photomultiplier provided with a suitable voltage supply, the combined photomultiplier and voltage supply being schematically designated by the block 31. It is well known that the anthracene crystal 30 is adapted to convert any incoming radiation such as gamma rays, neutrons, alpha particles, etc. into impulses of light. These impulses of light subsequently impinge upon the photomultiplier 31. The output of the photomultiplier is subsequently amplified in the linear amplifier 32.

The anthracene crystal 30 is directly exposed to a stream of monoenergetic alpha rays emitted by a suitable substance 33 such as polonium adjacent thereto and emitting alpha rays of energy 5.3 m.e.v. Instead of polonium any other suitable source of monoenergetic alpha rays having energy substantially above 2.5 m.e.v. may be used. We may use ionium (isolated from its daughter products) emitting alpha rays of energy 4.66 m.e.v. All the surface of the anthracene crystal except the portion of said surface that is in direct contact with the substance 33 is covered with a thin layer 34 of boron.

The performance of the instrument of Fig. 1 is based essentially upon the collision between the neutrons derived from the source 25 and the target nuclei of various elements contained in the formation adjoining the drill hole. As a result of these collisions three types of radiations are produced at the points of interaction between the neutrons and target nuclei, i.e. gamma rays, fast neutrons, and slow neutrons. The gamma rays are emitted by nuclei that become excited either by a collision or by a capture of a neutron and subsequently return to lower energy state. The fast and slow neutrons result from the collisions between the neutrons derived from the source 25 and the target nuclei of the formations. At each collision a neutron loses a portion of its energy, and therefore if the collision cross section of the target nucleus is large, the collisions are numerous and the energy of the impinging neutrons is progressively degraded until it reaches its "thermal value" of 0.025 e.v. Consequently slow neutrons are produced. On the other hand, if the collision cross section of the target nucleus in the formations is small, the collision is less frequent and consequently the neutrons do not lose their energy very noticeably. Consequently we obtain fast neutrons.

It is therefore apparent that the relative amounts of gamma rays, fast neutrons and slow neutrons produced in the above processes depend upon the chemical nature of various elements in the earth's formations. Thus by separately measuring these three radiations, valuable geological information may be derived concerning the nature of these formations.

The gamma rays and fast neutrons penetrate easily the boron layer 34 and interact with anthracene providing a suitable light impulse which subsequently strikes the photomultiplier 31 and causes electrical impulses to appear in the output of the amplifier 32. The slow neutrons are, however, absorbed by the boron in the layer 34, said boron emitting upon each absorption an alpha ray of an energy about 2.5 m.e.v. This alpha ray subsequently interacts with the anthracene crystal providing a suitable light impulse which subsequently strikes the photomultiplier 31 and causes electrical impulses to appear in the output of the amplifier 32.

It is well known that gamma rays, fast neutrons and slow neutrons do not interact directly with anthracene crystal. The interaction process is indirect and is different for each of these three radiations. Thus an incoming gamma ray interacts with one of the atoms of anthracene and causes ejection of a photoelectron or Compton electron, the energy of said electron being usually of the same order of magnitude as the energy of the incoming gamma ray. An incoming fast neutron strikes one of the nuclei of anthracene, such as nucleus of hydrogen in which case the nucleus recoils in form of a proton the energy of which is usually of the same order of magnitude as the energy of incoming fast neutron. An incoming slow neutron interacts with the boron layer 34 and causes emission of an alpha particle of an energy approximately 2.5 m.e.v. We obtain thus in each case an emission of an electrically charged particle of a different rest mass. An incoming gamma ray ejects an electron, an incoming fast neutron ejects a proton having a rest mass about 1800 times larger than the electron and an incoming slow neutron ejects an alpha particle having a rest mass about 7200 times larger than the electron. It is well known that the energy of an electrically charged particle that is used to excite the atoms of anthracene is larger, the smaller is the rest mass of the particle. The corresponding impulses of light emitted by anthracene atoms upon their return to the ground state are the most intense for light particles such as electrons, less intense for heavier particles such as protons, and the least intense for the heaviest particles such as alpha rays. Thus the light impulses, and consequently the electrical impulses resulting from these three radiations are substantially in the ratio 9:2:1, i.e. the impulses caused by gamma rays are about 9 times larger than those caused by alpha particles and the impulses caused by fast neutrons are about 2 times larger than those caused by alpha particles. This invention differentiates between these ranges of magnitude for separately detecting gamma rays, fast neutrons, and slow neutrons, respectively.

Figure 2:
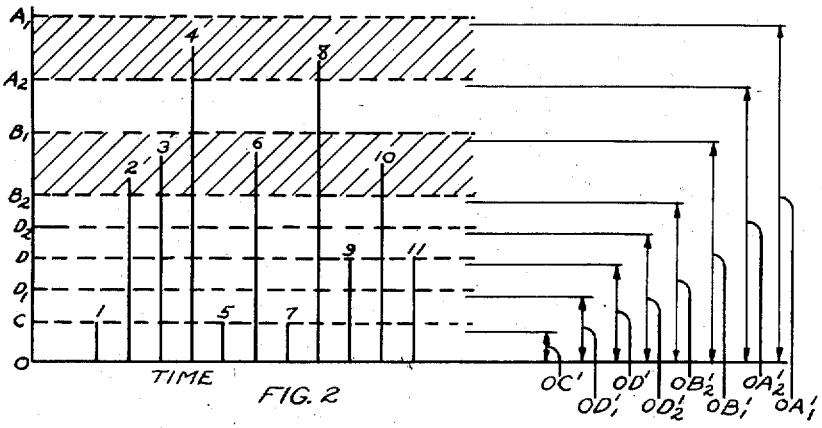
Fig. 2 illustrates diagrammatically current impulses representing various radiations detected in the bore hole.
Figure 4:
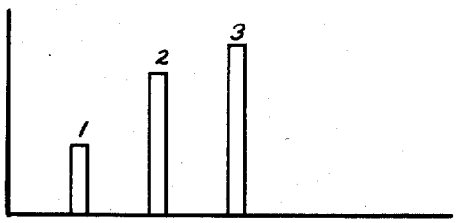
Fig. 4 shows diagrammatically the output of a pulse shaping network.

The output of the amplifier 32 is transmitted to the top of the bore hole through insulated conductors associated with the cable 12. This amplified output consists of a succession of discrete pulses, the magnitudes of which are within three energy ranges that represent gamma rays, fast neutrons, and slow neutrons, respectively. These output pulses are subsequently amplified in the second amplifier 39 located above the opening of the bore hole. The output of the amplifier 39 is connected to a pulse shaping network 40 which is of a standard type and is designed to provide an output voltage for each pulse that will have a rectangular shape and a variable height as shown in Fig. 4, said height representing the magnitude of the impulse. For description of pulse shaping networks see, for instance, the paper on "Counting rate meter for radioactivity measurements," published in General Radio Experimenter, vol. XXII, Nos. 2, 3, July-August 1947, pages 1–7. The output terminals of the pulse shaping network are in turn simultaneously applied to five gate elements designated by numerals 41, 42, 43, 44, and 45, respectively. The output of the pulse shaping network 40 consists of a succession of discrete pulses, the magnitude of each pulse serving to identify said pulse, i.e. to determine whether it corresponds to a gamma ray, to a slow neutron, or to a fast neutron. Fig. 2 gives a diagrammatical representation of such an output in which the abscissas represent the time of occurrence of the pulses and the ordinates represent the respective magnitudes of the pulses. The pulses have been designated by consecutive numerals such as 1, 2, 3, etc. These pulses have been subdivided into four energy groups which are designated by Roman numerals I, II, III, and IV.

Group I comprises pulses smaller than a predetermined value $OA_1$ and larger than a predetermined value $OA_2$. In Fig. 2 the pulses belonging to this group are designated as 4 and 8. These pulses correspond to gamma ray photons impinging upon the anthracene crystal 30.

Group II comprises pulses smaller than a predetermined value $OB_1$ and larger than a predetermined value $OB_2$. In Fig. 2 the pulses belonging to this group are designated as 2, 3, 6, and 10. These pulses correspond to fast neutrons impinging upon the anthracene crystal 30.

Group III comprises pulses having all substantially a predetermined value OC. In Fig. 2 the pulses belonging to this group are designated as 1, 5, and 7. These pulses correspond to slow neutrons impinging upon the anthracene crystal 3. More directly they correspond to approximately 2.5 m.e.v. alpha rays resulting from the interaction between slow neutrons and the boron layer 34.

Group IV comprises pulses having all substantially a predetermined value OD. These pulses correspond to 5.3 m.e.v. alpha rays emitted by the polonium source 33. In Fig. 2 the pulses belonging to this group are designated as 9 and 11.

The relative ranges of magnitudes of the groups I, II, III, and IV are considerably distorted in Fig. 2 in order to make the graphical presentation clear.

The output pulses as shown in Fig. 2 are simultaneously applied to five gate elements designated by numerals 41, 42, 43, 44, and 45, respectively. Each gate element is characterized by two threshold values, i.e. it is arranged to transmit only those impulses the magnitude of which is below the upper threshold and above the lower threshold.

Thus the gate 41 has an upper threshold determined by the value $OA_1$ and a lower threshold determined by the value $OA_2$. Consequently, this gate 41 transmits only the impulses of the group I. The gate 42 has an upper threshold determined by the value $OB_1$ and a lower threshold determined by the value $OB_2$. Consequently the gate 42 transmits only the impulses of the group II. The gate 43 has an upper threshold that is slightly above the value OC and a lower threshold that is slightly below the value OC. Consequently the gate 43 transmits only the impulses of the group III. The gate 44 is adapted to transmit signals having magnitude $OD_1$ somewhat smaller than OD, but cannot transmit signals having magnitude OD. Consequently the upper threshold of the gate 44 is slightly above the value $OD_1$ but below the value OD and the lower threshold is slightly below the value $OD_1$. The gate 45 is adapted to transmit signals having magnitude $OD_2$ somewhat larger than OD but cannot transmit signals having magnitude OD. Consequently the lower threshold of the gate 45 is slightly below the value $OD_2$ but above the value OD and the upper threshold is above the value $OD_2$.

The gates 41, 42, 43, 44, and 45 are provided with control terminals 51, 52, 53, 54, and 55, respectively, that receive corresponding control voltages.

The magnitude of the control voltage applied to the terminals 51 determines the value of the thresholds $OA_1$ and $OA_2$. By increasing (or decreasing) the control voltage the values of the thresholds $OA_1$ and $OA_2$ are increased (or decreased). However, the difference between the values $OA_1$ and $OA_2$ is maintained constant. Consequently the increase (or decrease) of the control voltages causes a shift of the transmitted band of magnitudes upwards toward larger values (or downwards towards smaller values). However, the width of the transmitter band is maintained constant and independent of the variation in the control voltage.

Similarly, the magnitude of the control voltage applied to the terminals 52 (or the control voltage applied to the terminals 53) determines the threshold values $OB_1$, $OB_2$ or the threshold values immediately above or immediately below the value OC. By increasing or decreasing the control voltage applied to terminals 52 (or the control voltage applied to terminals 53) the threshold values $OB_1$, $OB_2$ (or those immediately above and below OC) are correspondingly increased or decreased. However, the difference between these two thresholds is maintained constant and independent of the variation in the control voltage.

The output terminals of the gate elements 41, 42, 43 are connected through leads 56, 57, 58 to galvanometer coils 59, 60, 61, respectively. The galvanometer coils have attached thereto suitable mirrors in a manner well known to those skilled in the art and are adapted to reflect beams of light derived from a source 62, thereby effectively producing on the sensitive film 19 a record comprising three traces designated as 63, 64, 65, respectively, and representing the variations of the voltage applied to the galvanometer coils 59, 60, 61, respectively.

It is thus apparent that the trace 63 represents the neutron-gamma ray log, the trace 64 represents the neutron-fast neutron log, and the trace 65 represents the neutron-slow neutron log.

In order to provide a satisfactory arrangement for producing logs such as designated by 63, 64, and 65 consideration should be given to the temperature dependence of the nuclear detecting instrument. It is well known that the sensitivity of the anthracene crystal 30 decreases with the temperature, i.e. as the temperature of the crystal increases, the amount of light emitted by the crystal (as a result of interaction with an impinging nuclear particle) decreases and the magnitude of the electrical pulse emitted by the photomultiplier 31 becomes smaller.

As the exploring apparatus travels down to various depths in the drill hole it encounters various formations, the temperature of which undergoes some local variations and usually increases with depth. It is thus apparent that in order to compare two measurements performed at different temperatures we should provide an arrangement that compensates for the variation in sensitivity of the anthracene crystal. Such a compensating arrangement includes as one of its essential parts a suitable monoenergetic alpha ray emitter such as polonium 33 placed adjacently to the crystal 30. Under normal temperature conditions we obtain across the output terminals of the network 40 as a result of the radiation from the source 33, uniform electrical impulses having substantially the magnitude OD as shown in Fig. 2. These impulses designated as impulses of group IV cannot be transmitted through either of the gates 41, 42, 43. Furthermore, these impulses are too large to be transmitted through the gate 44 and too small to be transmitted through the gate 45. When, however, the temperature of the crystal increases, its sensitivity decreases. Consequently the impulses of the group IV decrease in size and when they reach the magnitude $OD_1$ they pass through the gate 44 and produce a suitable voltage across the output terminals 70 of said gate. On the other hand, when the temperature of the crystal decreases, its sensitivity increases. Consequently the impulses of the group IV increase in size and when they reach the magnitude $OD_2$ they pass through the gate 45 and produce a suitable voltage across the output terminals 71 of said gate.

It is thus apparent that when the sensitivity of the detector decreases we obtain a voltage across the terminals 70 and when the sensitivity increases, we obtain a voltage across the terminals 71. The terminals 70, 71 are respectively applied to excitation windings 72, 73 of a D.C. motor 74, said motor receiving its current supply from a battery 75. The windings 72, 73 are wound in such a manner as to produce two opposing magnetic fluxes. The motor 74 is adapted to displace angularly a rotatable conductive member 75 by means of a shaft 76. When the excitation winding 70 is energized by the voltage output from the gate 44, the member 75 effects an angular displacement in clockwise direction. When, however, the excitation winding 73 is energized by the voltage output from the gate 45, the member 75 effects an angular displacement in anticlockwise direction. One terminal 77 of the member 75 at the point of rotation is connected to a lead 78 and the other terminal 79 is slidingly engaged on a fixed semicircular resistor 80, said resistor having its two terminals 81, 82 connected to a battery 83.

It is apparent that the voltage between the grounded terminals 82 and the lead 78 decreases when the member 75 rotates clockwise and increases when it rotates anticlockwise. This voltage is simultaneously transmitted to the control terminals 51, 52, 53, 54, and 55 of the gates 41, 42, 43, 44, and 45, respectively.

In order to understand the operation of the compensating arrangement, assume that the exploring instrument is exposed to an increase in temperature. Consequently, the sensitivity of the detecting apparatus decreases. The impulses corresponding to gamma rays do not fall any longer within a range of magnitudes $OA_1$, $OA_2$ shown in Fig. 2. They fall within a lower range of magnitudes defined by limits $OA_1^1$ and $OA_2^1$, which are respectively below the corresponding limits $OA_1$ and $OA_2$ as shown in Fig. 2. Similarly, the impulses corresponding to fast and slow neutrons do not fall any more within magnitude ranges $OB_1$ and $OB_2$ and OC, respectively, but within lower ranges of magnitudes defined by limits $OB_1^1$, $OB_2^1$ and by the value $OC^1$, respectively.

It is therefore apparent that when the temperature of the crystal is increased, the gates 41, 42, 43 are not adapted any more to transmit impulses that are caused by gamma rays, fast neutrons and slow neutrons, respectively. It is therefore necessary to modify the transmitting characteristics of the gates 41, 42, and 43, so as to lower the bands of magnitudes from the positions $A_1A_2$; $B_1B_2$; and C to the positions $A_1^1A_2^1$; $B_1^1B_2^1$; and $C^1$. This is effected by means of the control voltage appearing across the output terminals 70 of the gate 44 in the manner hereinabove described. Said control voltage causes the rotation of the shaft 75 in a clockwise direction. It is apparent that as the shaft 75 rotates, the control voltages applied to the terminals 51 to 55 decrease in magnitude and cause a progressive downward shift of the threshold values of the corresponding gates 41 to 45. In particular, the range of magnitudes transmitted through the gate 44 is not any more defined by the magnitude $OD_1$ but by a lower value. Consequently, the impulses corresponding to alpha rays from the polonium source 33 cannot pass any longer through the gate 44. Thus the voltage across the terminals 70 drops to zero and consequently the member 75 stops rotating and reaches a stationary position corresponding to a decrease in the control voltages to the terminals 51, 52, and 53 by a definite amount. This amount is such that the new thresholds corresponding to the gate 41 are not any more $OA_1$, $OA_2$, but $OA_1^1$, $OA_2^1$. The new thresholds corresponding to the gate 42 are not any more $OB_1$, $OB_2$, but $OB_1^1$, $OB_2^1$, and the value transmitted through the gate 43 is not OC but $OC^1$.

It is thus apparent that when the temperature of the crystal increases and its sensitivity correspondingly decreases the thresholds of the gates 41, 42, 43 adjust themselves automatically so that the gate 41 will accept all the impulses originated by gamma rays and the gates 42, 43 will accept all the impulses originated by fast neutrons and slow neutrons, respectively. A similar automatic adjustment, but in the opposite direction, takes place when the temperature of the crystal decreases and its sensitivity correspondingly increases.

Figure 3:
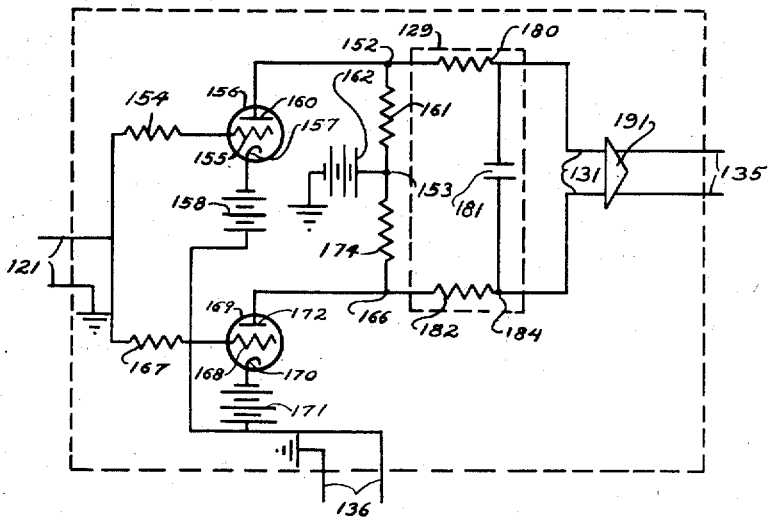
Fig. 3 shows schematically an electric circuit for transmitting impulses within a predetermined band of magnitudes.

Consider now Fig. 3 showing in detail the schematic arrangement of a gate such as one of those designated by numerals 41–45 in Fig. 2. The gate has input terminals 121, output terminals 135 and control terminals 136. The control terminals 136 may be either of those designated by 51–55 in Fig. 1 and the output leads may be either of those designated by 56, 57, 58, 70, 71 in Fig. 1.

The essential element of the gate consists of a band channel comprising two individual channels designated as A and B. The band channel has its input terminals 121, output terminals 152, 166 and control terminals 136. It is arranged to give across its output terminals a D.C. voltage of constant value $V_1$ only when the input signal applied to terminals 121 is contained within a predetermined range of magnitudes constituting the transmission band. This range of magnitudes is fixed by the control voltage applied to the terminals 136. That is, with a certain setting for the control voltage the circuit will be responsive only to input voltages within a predetermined band. If the input voltage is outside the band no output will be produced.

Assume now that n impulses have magnitudes within the transmission band entered at the input terminals 121. These impulses produce across the terminals 152, 166 n voltage impulses having uniform value $V_1$, each of said voltage impulses having a very short but constant duration. By integrating these impulses per unit of time we obtain a value representing the relative occurrence of impulses within said predetermined band. This is effected by applying the output terminals 152, 166 to an integrator comprised within the dotted block 129 which will produce across its output terminals 131 a voltage representing the frequency of occurrence of said impulses. This voltage amplified in the amplifier 191 is applied to the output terminals 135.

The channel A comprised within the band channel has input terminals 121 and output terminals 152, 153. One of the input terminals is connected through the resistor 154 to the grid 155 of a triode 156, said triode having its cathode 157 connected in series with a biasing battery 158 and with a control voltage applied to the control terminals 136. The plate 160 of the triode is connected through the output terminal 152, resistor 161 to the output terminal 153 and then through the battery 162 to ground.

The channel B comprised within the band channel has input terminals 121 and output terminals 153, 166. One of the input terminals is connected through the resistor 167 to the grid 168 of a triode 169, said triode having its cathode 170 connected in series with a biasing battery 171 and with a control voltage applied to the control terminals 136. The plate 172 of the triode is connected through the output terminal 166, resistor 174 to the output terminals 153 and then through the battery 162 to ground.

It is apparent that we obtain across the output terminals 152, 153 only those impulses that are capable of overcoming the biasing voltage of the tube 156. Assume that the voltage of the battery 158 is $E_1$ and that the voltage applied to the control terminals 136 is $E_c$. Then the total biasing voltage is $E_1+E_c$. Therefore, only the impulses that are capable of exceeding the threshold value provided by the total biasing voltage are transmitted through the channel A and appear across the output terminals 152, 153.

Similarly, in the channel B only those voltages appear across the output terminals 166, 153 that are capable of overcoming the biasing voltage of the tube 169. Assume that the voltage of the battery 171 is $E_2$. Then the total biasing voltage of the tube 169 is $E_2+E_c$. Consequently, only those impulses that are capable of exceeding the threshold value $E_2+E_c$ appear across the terminals 166, 153.

The two output voltages across the terminals 152, 153 and 166, 153 are mounted in opposition, so that the resultant output between the terminals 152, 166 is equal to their difference. Consider now three cases designated as (a), (b), and (c).

Case (a).—The impulse applied to the terminals 121 has a value below the threshold voltages of the tubes 156 and 169. Consequently, no plate currents will be delivered by these tubes and no voltage will appear across the terminals 152, 166.

Case (b).—The impulse applied to the terminals 121 has a value above the threshold voltages of the tubes 156 and 169. Consequently, both tubes deliver plate currents, and two short voltage impulses appear simultaneously across the output terminals 152, 153 and 166, 153. Since these two voltages are equal one to another, the resultant voltage across the terminals 152, 166 is zero.

Case (c).—The impulse applied to the terminals 121 has a value smaller than the threshold of the tube 169, i.e. smaller than $E_2+E_c$ and larger than the threshold of the tube 156, i.e. larger than $E_1+E_c$. Consequently, a plate current will pass through the tube 156 and no plate current will pass through the tube 169. Consequently, no voltage will be produced across the terminals 166, 153 and a short voltage impulse will appear across the terminals 152, 153. We obtain, therefore, across the terminals 166, 152 a resultant voltage coincident with the impulse applied to the terminals 121.

It is thus apparent that at any instant only those impulses that are comprised within the range limited by the value $E_1+E_c$ and $E_2+E_c$ produce corresponding output impulses across the terminals 166, 152.

The output impulses derived from terminals 166, 152 are applied to an integrating network 129 comprising series resistors 180, 182 and a shunt condenser 181. This network is adapted to translate the voltage applied across its input terminals 152, 166 into an output voltage across the terminals 131 that represents the time integral of the input voltage. Each impulse comprised within the two threshold values that arrive at the terminals 121 corresponds to an output voltage across terminals 152, 166, said output voltage having a fixed value $V_1$ and a fixed duration $\Delta t$. Consequently, we obtain across the output terminals 131 of the integrator a voltage having value $\Sigma V_1 \Delta t$ that represents the number of impulses per unit of time comprised within the range limited by value $E_2+E_c$ and $E_1+E_c$. The voltage derived from the terminals 131 is applied through an amplifier 191 to the output terminals 135.

If we refer now to the gate 41 at normal temperature, then the value $E_2+E_c$ corresponds to the upper threshold $OA_1$, the value $E_1+E_2$ corresponds to the lower threshold $OA_2$. If the temperature increases then the control voltage applied to the terminals 41 decreases by an amount $\Delta E_c$ and assumes a new value $E_c+\Delta E_c$. Then the upper threshold assumes a new value $OA_1^1$ corresponding to $E_2+E_c-\Delta E_c$ and the lower threshold assumes a new value $OA_2^1$ corresponding to $E_1+E_c-\Delta E_c$. It is apparent that the width of the transmitted band is determined by $E_2-E_1$ and is independent of the value of the control voltage. When the control voltage increases the band is shifted upwards; when it decreases, the band is shifted downward.

Similar relationships hold for all the remaining gates 42–45. It should be noted that at normal temperature the gates 43, 44, 45 admit very narrow bands comprising the magnitudes $OC_1$, $OD_1$, and $OD_2$, respectively. Thus in case of the gate 43 the value $E_2+E_c$ corresponds to value slightly above OC, the value $E_1+E_c$ corresponds to a value slightly below OC and the width $E_2-E_1$ is relatively small. When the temperature increases the band is lowered but maintains its width. The new limits correspond to values $E_2+E_c-\Delta E$, $E_1-\Delta E$ and the new position of the band includes the value $OC^1$. Similar relationship held for gates 44 and 45.

I claim:

1. A system for determining the character of formations traversed by a bore hole the temperature of said hold varying with depth comprising a source of neutrons, a radiation detector, a temperature detector and a means for lowering said source and said two detectors to various depths within said hole, whereby the formations adjacent to said hole at said depth are irradiated with neutrons from said source and emit gamma rays and other neutrons as result of said irradiation, said radiation detector being responsive to said gamma rays and said other neutrons for producing electrical impulses within two predetermined ranges of magnitude, the electrical impulses corresponding to gamma rays being in a different range of magnitudes from the electrical impulses corresponding to neutrons, said ranges of magnitude varying with temperature, an electrical selective network of variable selectivity connected to said detector for selectively receiving impulses within one of said two ranges of magnitude, and means responsive to the output of said temperature detector for varying the selectivity of said network and an indicator connected to said network.

2. A measuring arrangement for determining physical characteristics of an unknown substance, said substance at various surrounding temperatures being adapted to emit gamma rays and neutrons when irradiated by a stream of neutrons, comprising a source of neutrons for irradiating said substance, a detector responsive to gamma rays and neutrons emitted by said substance for producing electrical impulses with two predetermined ranges of magnitude, the electrical impulses corresponding to gamma rays being within a different range of magnitudes from the electrical impulses corresponding to neutrons, said ranges of magnitude depending upon the temperature of said detector, a temperature sensing element for producing a signal representing the temperature of said detector, an electrical network of variable selectivity connected to said detector for selectively receiving impulses within one of said two ranges of magnitude, means responsive to said signal for varying the selectivity of said network, and an indicator connected to said network.

3. A system for determining the character of formations traversed by a bore hole, the temperature in said hole varying with depth, said system comprising a source of neutrons, a radiation detector, a temperature detector, means for lowering said source and said two detectors to various depths within said hole whereby the formations adjacent to said hole at various depths are irradiated with neutrons from said source and emit gamma rays and other neutrons as result of said irradiation, said radiation detector being responsive to said gamma rays and said other neutrons for producing electrical impulses within two predetermined ranges of magnitude, said ranges of magnitude varying with temperature of said hole, an electrical selective network of variable selectivity connected to said detector for selectively and separately receiving said impulses within one of said two ranges of magnitude, and means responsive to the output of said temperature detector for varying the selectivity of said network.

4. An apparatus for measuring a stream of radiation comprising particles of various energies, a detector responsive to said particles for producing electrical impulses with various ranges of magnitude, said ranges of magnitude corresponding to the energies of said particles and varying with the temperature of said detector, a temperature responsive element for producing a signal representing the temperature of said detector, an electrical selective network of variable selectivity connected to said detector for selectively and separately receiving said impulses within one of said ranges of magnitude, and means responsive to said signal for varying the selectivity of said network.

5. An apparatus for measuring frequency of arrival of incoming particles having characteristic energy, a detector responsive to said particles for producing a succession of impulses, the frequency of said impulses representing the frequency of arrival of said particles, the magnitude of said impulses representing said energy, said magnitude varying with any departure of the temperature of said detector from a suitable normal value, a variable gate network connected to said detector for transmitting impulses within predetermined range and having a variable parameter for determining said range whereby said range corresponds to said magnitude at said normal temperature, a temperature sensitive element adjacent to said detector for producing a signal representing the departure of said temperature from normal, and means responsive to said signal to vary said parameter thereby modifying the value of said range in order to make it correspond to the variation of said magnitude caused by said departure, and an indicator connected to said gate network for indicating the frequency of the transmitted impulses.

6. In an apparatus for measuring frequency of arrival of incoming particles having characteristic energy, a detector responsive to said particles for producing a succession of impulses, the frequency of said impulses representing the frequency of arrival of said particles, the magnitude of said impulses representing said energy, said magnitude varying with any departure of the temperature of said detector from a suitable normal value, a variable gate network connected to said detector for transmitting impulses within predetermined range and having a variable parameter for determining said range whereby said range corresponds to said magnitude at said normal temperature, a source of reference particles of known energy adjacent to said detector, whereby said detector produces reference impulses in response to said reference particles, the magnitude of said reference particles being indicative of said temperature, means responsive to said reference impulses for producing a signal representing the departure of said temperature from normal, and means responsive to said signal to vary said parameter thereby modifying the value of said range in order to make it correspond to the variation of said magnitude caused by said departure, and an indicator connected to said gate network for indicating the frequency of the transmitted impulses.

7. In an apparatus for measuring frequency of arrival of incoming particles having characteristic energy, a detector responsive to said particles for producing a succession of impulses representing the frequency of arrival of said particles, the magnitude of said impulses representing said energy, a source of reference particles of known energy positioned to cause a response in said detector, whereby said detector produces reference impulses in response to said reference particles, the magnitude of said reference impulses indicating the sensitivity of said detector, means for determining the variation of said reference impulses, and means for controlling the magnitude of said first impulses.

8. In a radioactivity well logging system for determining the character of formations traversed by a borehole, a radiation detector of the pulse producing type adapted to be lowered into the borehole, said detector providing signal output pulses corresponding to radiation particles received by the detector from the formation the magnitude of which is related to the nature of the corresponding radiation particle, a source of control radiation particles adapted to be lowered with said detector, said control particles having a nature substantially different from the nature of particles received by the detector from the formations, means for impressing particles from said control source on said detector in substantially fixed amount so that said detector provides output control pulses corresponding to said impressed control particles of substantially different magnitude than the magnitudes of said signal output pulses, an electrical selective network for selecting those signal output pulses which fall within a predetermined range of magnitudes, means for detecting changes in the magnitude of said output control pulses, and means controlled by said detecting means for varying the selectivity of said electrical network, thereby to compensate for changes in the response of said detector.

9. In a radioactivity well logging system for determining the character of formations traversed by a borehole, a radiation detector of the pulse producing type adapted to be lowered into the borehole, said detector providing first signal output pulses within a first range of magnitudes corresponding to radiation particles of a first nature received by the detector from the formation and second output pulses within a second range of magnitudes corresponding to radiation particles of a second nature received by the detector from the formation, a source of control radiation particles adapted to be lowered with said detector, said control particles having an energy substantially different from the energy of particles of both said natures received by the detector from the formation, means for impressing particles from said control source on said detector in substantially fixed amount so that said detector provides output control pulses corresponding to said impressed control particles of substantially different magnitude than said first and second signal output pulses, electrical selective networks for selectively receiving said first and second signal output pulses, means for detecting changes in the magnitude of said output control pulses, and means controlled by said detecting means for varying the selectivity of at least one of said networks, thereby to compensate for changes in the response of said detector.

10. In a radioactivity well logging system for determining the character of formations traversed by a borehole, a radiation detector of the pulse producing type adapted to be lowered into the borehole, said detector providing signal output pulses corresponding to radiation particles received by the detector from the formation the magnitude of which is related to the nature of the corresponding radiation particle, a source of neutrons adapted to be lowered with said detector, whereby the formations adjacent said borehole are irradiated with neutrons from said source and gamma rays and neutrons are received by said detector as a result of said irradiation, the signal output pulses produced by said detector in response to gamma rays received by said detector falling within a substantially different range of magnitudes from that of the signal output pulses produced by said detector in response to neutrons received by said detector, a source of control radiation particles adapted to be lowered with said detector, said control particles having a nature substantially different from that of said gamma rays and neutrons received by said detector, means for impressing particles from said control source on said detector in substantially fixed amount so that said detector provides output control pulses corresponding to said impressed control particles of substantially different magnitude than said signal output pulses, electrical selective networks for separating said gamma ray signal output pulses from said neutron signal output pulses, means for detecting changes in the amplitude of said output control pulses, and means controlled by said detecting means for varying the selectivity of at least one of said networks, thereby to compensate for changes in the response of said detector.

11. In a radioactivity well logging system for determining the character of the formations traversed by a borehole, a radiation detector, a source of neutrons and control radiation particles adapted to be lowered with said detector within the borehole, whereby the formations adjacent said borehole are irradiated with neutrons from said source and gamma rays and neutrons are received by said detector as a result of said irradiation, said detector responding to said received gamma rays by producing corresponding signal output pulses within a first range of magnitudes and responding to said received neutrons by producing corresponding signal output pulses within a second range of magnitudes, said detector also responding to control particles from said source by producing output control pulses within a third range of magnitudes, electrical selective networks for separating said gamma ray signal output pulses and said neutron signal output pulses, means for detecting changes in the magnitude of said output control pulses, and means controlled by said detecting means for varying the selectivity of said electrical networks, thereby to compensate for changes in the response of said detector.

*12. A radioactivity well logging system of the type provided with a subsurface instrument having a sealed housing adapted to withstand the pressures encountered within a deep narrow well, a radiation detecting system of the type which employs a scintillation counter disposed within said housing and including a photomultiplier, said radioactivity well logging system also including amplifying and pulse conditioning elements as well as electrical means operatively connecting said elements together and to a transmission cable, means also disposed within said housing and associated with said photomultiplier, in a manner such that the output of said photomultiplier is responsive to at least one parameter that produces an undesired effect in the radiation detecting system, and means for utilizing the response of said photomultiplier for varying the operating characteristics of at least one of said elements in the radioactivity well logging system whereby compensation is made for the undesired effect produced in the radiation detecting system.*

*13. A radioactivity well logging system of the type provided with a subsurface instrument having a sealed housing adapted to withstand the pressures encountered within a deep narrow well, a radiation detecting system of the type which employs a scintillation counter disposed within said housing and including a photomultiplier, said radioactivity well logging system also including amplifying and pulse conditioning elements as well as electrical means operatively connecting said elements together and to a transmission cable, means also disposed within said housing and associated with said photomultiplier, in a manner such that the output of said photomultiplier is responsive to changes in temperature, and means for utilizing the response of photomultiplier for varying the operating characteristics of at least one of said elements*

*in the radioactivity well logging system whereby compensation is made for variations in operating characteristics of the radiation detecting system that are due to changes in temperature.*

*14. A radioactivity well logging system of the type provided with a subsurface instrument having a sealed housing adapted to withstand the pressures encountered within a deep narrow well, a radiation detecting system of the type which employs a scintillation counter disposed within said housing and including a photomultiplier, said radioactivity well logging system also including amplifying and pulse conditioning elements as well as electrical means operatively connecting said elements together and to a transmission cable, means also disposed within said housing and associated with said photomultiplier, in a manner such that the output of said photomultiplier is responsive to at least one parameter that produces an undesired effect in the radiation detecting system, and means for utilizing the response to said photomultiplier for varying the output of the radioactivity well logging system whereby compensation is made for the undesired effect produced in the radiation detecting system.*

*15. A radioactivity well logging system of the type provided with a subsurface instrument having a sealed housing adapted to withstand the pressures encountered within a deep narrow well, a radiation detecting system of the type which employs a scintillation counter disposed within said housing and including a photomultiplier, said radioactivity well logging system also including amplifying and pulse conditioning elements as well as electrical means operatively connecting said elements together and to a transmission cable, means also disposed within said housing and associated with said photomultiplier, in a manner such that the output of said photomultiplier is responsive to changes in temperature and voltage, and means for utilizing the response of photomultiplier for varying the operating characteristics of at least one element in the radioactivity well logging system whereby compensation is made for variations in operating characteristics of the radiation detecting system that are due to changes in temperature and voltage.*

*16. A well exploring device capable of detecting radiations, comprising scintillating crystal means capable of scintillating under the effect of received radiations, means for developing pulses in response to scintillations produced within said crystal means, means for selecting certain ones of said developed pulses in accordance with the height thereof and developing a direct current output signal proportional to the frequency of occurrence of the pulses selected by said pulse height selecting means, and means for rendering said direct current output signal substantially independent of temperature variations in the earth formations.*

*17. A well exploring device capable of detecting radiations, comprising a subsurface unit capable of being raised and lowered within a borehole on an electric cable, scintillating crystal means in said unit and capable of scintillating under the effect to received radiations, means in said unit for developing pulses in response to scintillations produced within said crystal means, means for selecting certain of said developed pulses in accordance with the height thereof and developing an output signal proportional to the frequency of occurrence of the pulses selected by said pulse height selecting means, and means for preventing said output signal from varying in response to ambient temperature variations of the borehole as said unit traverses the borehole.*

*18. A well exploring device capable of detecting radiations, comprising a subsurface unit capable of being raised and lowered within a borehole on an electric cable, scintillating crystal means in said unit and capable of scintillating under the effect of received radiations, means in said unit for developing pulses in response to scintillations produced within said crystal means, means for transmitting said developed pulses over said cable to the earth's surface, means at the earth's surface for selecting certain of said developed pulses in accordance with the height thereof, means for developing an output signal proportional to the frequency of occurrence of the pulses selected by said pulse height selecting means, and means for preventing substantial variation of said output signal in response to ambient temperature variations of the borehole as said unit traverses the borehole.*

*19. A well exploring device capable of detecting radiations, comprising scintillating crystal means capable of scintillating under the effect of received radiations, means for developing pulses in response to scintillations produced within said crystal means, means for selecting certain ones of said developed pulses in accordance with the height thereof and developing a direct current output signal proportional to the frequency of occurrence of the pulses selected by said pulse height selecting means, and means for rendering said direct current output signal substantially independent of variations in an undesired characteristic when within the well.*

*20. A radiation well logging system, comprising a subsurface unit capable of being raised and lowered within a borehole on an electric cable, said subsurface unit being capable of detecting first and second radiations, a first radiation responsive channel at the earth's surface and capable of producing first electrical pulses corresponding to said first radiations, a second radiation responsive channel at the earth's surface and capable of producing second electrical pulses corresponding to said second radiations, first means at the earth's surface for producing a first electric current proportional to the frequency of occurrence of said first pulses, second means at the earth's surface for producing a second electric current proportional to the frequency of occurrence of said second pulses, recorder means capable of recording simultaneously on a single chart the values of said first and second electric currents so that a simultaneous record is produced on the chart representative of the intensities of said first and second radiations as said unit traverses the borehole, and means for rendering said first and second electric currents substantially independent of ambient temperature variations of the borehole as said unit traverses the borehole.*

*21. A radiation well logging system, comprising a subsurface unit capable of being raised and lowered within a borehole on an electric cable, said subsurface unit being capable of detecting two different kinds of radiations, a first radiation responsive channel at the earth's surface and capable of producing first electrical pulses corresponding to one of said radiations, a second radiation responsive channel at the earth's surface and capable of producing second electrical pulses corresponding to the other of said radiations, first means at the earth's surface for producing a first electric current proportional to the frequency of occurrence of said first pulses, second means at the earth's surface for producing a second electric current proportional to the frequency of occurrence of said second pulses, recorder means capable of recording simultaneously on a single chart the values of said first and second electric currents so that a simultaneous record is produced on the chart representative of the intensities of said two kinds of radiations as said unit traverses the borehole, and means for preventing said first and second electric currents from varying in response to ambient temperature variations of the borehole as said unit traverses the borehole.*

*22. A radiation well logging system comprising a subsurface unit capable of being raised and lowered within a borehole on an electric cable, a source of neutrons in said unit for bombarding the formations surrounding the borehole, scintillating crystal means in said unit and capable of scintillating under the effect of received radiations, a first radiation responsive channel at the earth's surface and capable of producing first electrical pulses*

*corresponding to first radiations intercepted by said scintillating crystal means, a second radiation responsive channel at the earth's surface and capable of producing second electrical pulses corresponding to second radiations intercepted by said scintillating crystal means, at least one of said first and second radiations being responsive to said neutron bombardment of the formations, first means at the earth's surface for producing a first electric current proportional to the frequency of occurrence of said first pulses, second means at the earth's surface for producing a second electric current proportional to the frequency of occurrence of said second pulses, recorder means capable of recording simultaneously on a single chart the values of said first and second electric currents so that a simultaneous record is produced on the chart representative of the intensities of said first and second radiations as said unit traverses the borehole, and means for preventing substantial variation of said first and second electric currents in response to ambient temperature variations of the borehole as said unit traverses the borehole.*

*23. A radiation well logging system, comprising a subsurface unit capable of being raised and lowered within a borehole on an electric cable, scintillating crystal means in said unit and capable of scintillating under the effect of received radiations, a first radiation responsive channel at the earth's surface and capable of producing first electrical pulses corresponding to first radiations intercepted by said scintillating crystal means, a second radiation responsive channel at the earth's surface and capable of producing second electrical pulses corresponding to second radiations intercepted by said scintillating crystal means, first means at the earth's surface for producing a first electric current proportional to the frequency of occurrence of said first pulses, second means at the earth's surface for producing a second electric current proportional to the frequency of occurrence of said second pulses, recorder means capable of recording simultaneously on a single chart the values of said first and second electric currents so that a simultaneous record is produced on the chart representative of the intensities of said first and second radiations as said unit traverses the borehole, and means for rendering said first and second electric currents substantially independent of ambient temperature variations of the borehole as said unit traverses the borehole.*

*24. A radiation well logging system, comprising a subsurface unit capable of being raised and lowered within a borehole on an electric cable, a source of neutrons in said unit for bombarding the formations surrounding the borehole, a single unit scintillation crystal in said unit and capable of scintillating under the effect of received radiations, means in said unit for developing electrical pulses in response to scintillations produced in said crystal, a first radiation responsive channel at the earth's surface and connected to said cable for producing first electrical pulses corresponding to a first selected portion of the radiations intercepted by said crystal, a second radiation responsive channel at the earth's surface and connected to said cable for producing second electrical pulses corresponding to a second selected portion of the radiations intercepted by said crystal, said first channel including means for producing a first electric current proportional to the frequency of occurrence of said first pulses, said second channel including means for producing a second electric current proportional to the frequency of occurrence of said second pulses, recorder means including a single chart which is driven in synchronism with vertical movement of said unit within the borehole and capable of recording simultaneously the intensity of said first and second electric currents so that a simultaneous record is produced on said chart representative of the intensities of said selected first and second radiations as said unit is moved within the borehole, and means for preventing substantial variation of said first and second electric currents in response to ambient temperature variations of the borehole as said unit traverses the borehole.*

*25. A well exploring device capable of detecting radiations, comprising a subsurface unit capable of being raised and lowered within a borehole on an electric cable, scintillating crystal means in said unit and capable of scintillating under the effect of received radiations, means in said unit for developing pulses in response to scintillations produced within said crystal means, means for selecting certain of said developed pulses within a predetermined band of pulse heights and rejecting those pulses having heights above and below said band, means for developing an output signal proportional to the frequency of occurrence of the pulses selected by said last named means, and means for preventing said output signal from varying in response to ambient temperature variations of the borehole as said unit traverses the borehole.*

*26. In an apparatus for measuring frequency of arrival of incoming radiation quanta having characteristic energy, a detector comprising a scintillation crystal and cooperating photosensitive device, said detector being responsive to said radiation quanta for producing a succession of impulses representing the frequency of arrival of said radiation quanta, the magnitude of said impulses representing said energy, means for developing output pulses corresponding to said produced impulses, means for producing reference pulses of radiation quanta of known energy positioned to cause a response in said detector, whereby said detector produces reference impulses in response to said reference pulses of radiation quanta, the magnitude of said reference impulses indicating the sensitivity of said detector, means for determining the variation of said reference impulses, and means for controlling the magnitude of said output pulses.*

*27. In a radiation well logging system of the type which includes a subsurface unit capable of being raised and lowered within a borehole on an electric cable, said system being capable of measuring frequency of arrival of radiation quanta of characteristic energy incoming to said subsurface unit, comprising a detector positioned in said subsurface unit and comprising a scintillation crystal and cooperating photosensitive device, said detector being responsive to said radiation quanta for producing a succession of impulses representing the frequency of arrival of said radiation quanta, the magnitude of said impulses representing said energy, means for developing output pulses corresponding to said produced impulses, means for producing reference radiation quanta of known energy positioned to cause a response in said crystal, whereby said detector produces reference impulses in response to said reference radiation quanta, the magnitude of said reference impulses indicating the sensitivity of said detector, means for determining the variation of said reference impulses, and means for controlling the magnitude of said output pulses.*

*28. In an apparatus for measuring frequency of arrival of incoming radiation quanta having characteristic energy, a housing, a radiation detector system including a scintillation crystal and cooperating photomultiplier tube disposed within said housing, said detector system being responsive to said radiation quanta for producing a succession of impulses representing the frequency of arrival of said radiation quanta, the magnitude of said impulses representing said energy, means for developing output pulses corresponding to said produced impulses, means also disposed within said housing and associated with said photomultiplier in a manner such that the output of said photomultiplier is responsive to at least one parameter that produces an undesired effect in the radiation detector system, and means for utilizing the response of said photomultiplier for varying the operating characteristics of said apparatus whereby compensation is made for the undesired effect produced in the radiation detector system.*

*29. In an apparatus for measuring frequency of ar-*

*rival of incoming radiation particles having characteristic energy, a detector responsive to said particles for producing a succession of impulses representing the frequency of arrival of said particles, the relative magnitude of said impulses with respect to a reference value representing said energy, a source of reference particles of known energy positioned to cause a response in said detector, whereby said detector produces reference impulses in response to said reference particles, the magnitude of said reference impulses indicating the sensitivity of said detector, means for determining the variation of said reference impulses, and means for controlling the magnitude of said first impulses with respect to said reference value.*

*30. In an apparatus for measuring frequency of arrival of incoming radiation quanta having characteristic energy, a detector responsive to said radiation quanta for producing a succession of impulses representing the frequency of arrival of said radiation quanta, the magnitude of said impulses representing said energy, a source of radiation pulses of known energy positioned to cause a*

*response in said detector, whereby said detector produces reference impulses in response to said radiation pulses, the magnitude of said reference impulses indicating the sensitivity of said detector, means for determining the variation of said reference impulses, and means for controlling the magnitude of said first impulses.*

References Cited in the file of this patent or the original patent

UNITED STATES PATENTS

| | | |
|---|---|---|
| 2,469,460 | Fearon | May 10, 1949 |
| 2,483,139 | Herzog | Sept. 27, 1949 |

OTHER REFERENCES

Coltman: Proceedings of the I.R.E., vol. 37, No. 6, June 1949, pages 671–682.

Parsons: Proceedings of the I.R.E., vol. 37, No. 5, May 1949, pages 564–568.